US011830268B2

(12) United States Patent
Mokhtari et al.

(10) Patent No.: US 11,830,268 B2
(45) Date of Patent: Nov. 28, 2023

(54) HIERARCHAL DOCUMENT CLASSIFICATION SYSTEM AND METHOD

(71) Applicant: KYOCERA DOCUMENT SOLUTIONS INC., Osaka (JP)

(72) Inventors: Ali Mokhtari, Walnut Creek, CA (US); Oleg Y. Zakharov, Walnut Creek, CA (US)

(73) Assignee: KYOCERA Document Solutions Inc., Osaka (JP)

(*) Notice: Subject to any disclaimer, the term of this patent is extended or adjusted under 35 U.S.C. 154(b) by 454 days.

(21) Appl. No.: 17/098,888

(22) Filed: Nov. 16, 2020

(65) Prior Publication Data

US 2022/0156488 A1    May 19, 2022

(51) Int. Cl.
| | |
|---|---|
| *G06F 18/20* | (2023.01) |
| *G06F 18/214* | (2023.01) |
| *G06F 18/24* | (2023.01) |
| *G06V 30/41* | (2022.01) |
| *G06V 30/414* | (2022.01) |
| *G06V 30/42* | (2022.01) |
| *G06N 5/01* | (2023.01) |

(Continued)

(52) U.S. Cl.
CPC ......... *G06V 30/413* (2022.01); *G06F 18/214* (2023.01); *G06F 18/22* (2023.01); *G06F 18/2431* (2023.01); *G06F 40/279* (2020.01); *G06N 20/00* (2019.01)

(58) Field of Classification Search
USPC ....... 382/112, 128–140, 154–181; 704/1–10, 704/231–275; 706/1–62, 900–903; 707/705–780
See application file for complete search history.

(56) References Cited

U.S. PATENT DOCUMENTS 7,039,856 B2    5/2006 Peairs et al.
11,080,340 B2*  8/2021 Cormack ............... G06N 20/00
(Continued)

OTHER PUBLICATIONS

Hagen J D, Computing Device For Providing Hierarchical Classifiers, Has Processor For Alternatively Applying First Type Of Prediction Threshold Of Superclass Classifier And Second Type Of Threshold Of Subclass Classifier To Classify Data Segments, 20/20/2016 (Year: 2016).*

*Primary Examiner* — Marcellus J Augustin
(74) *Attorney, Agent, or Firm* — GrowIP Law Group LLC (57) ABSTRACT

A method performed by a computing system comprises receiving, by a hierarchical document classification system (HDCS), a document that includes image data and textual data, wherein the document is associated with a document type. The HDCS determines a first machine learning (ML) classifier of the HDCS associated with the document type. The first ML classifier corresponds to one of an image-based ML classifier of the HDCS and a text-based ML classifier of the HDCS. The determined first ML classifier classifies the document as being associated with a particular class of document of a plurality of classes of documents. A second ML classifier associated with the class of document classifies the document as being associated with a particular subclass of a plurality of subclasses of the class of document. The HDCS communicates information that specifies the class and the subclass associated with the document to a terminal.

17 Claims, 7 Drawing Sheets

(51) Int. Cl.
  *G06N 5/04* (2023.01)
  *G06V 30/413* (2022.01)
  *G06N 20/00* (2019.01)
  *G06F 40/279* (2020.01)
  *G06F 18/22* (2023.01)
  *G06F 18/2431* (2023.01)

(56) References Cited

U.S. PATENT DOCUMENTS

2017/0270115 A1* 9/2017 Cormack .............. G06F 16/285
2019/0147103 A1* 5/2019 Bhowan ............... G06V 10/454
  707/737
2020/0301955 A1* 9/2020 Ludlow .................. G06N 99/00

* cited by examiner

FIG. 7 ered with a document type. The first ML classifier corre-
HIERARCHAL DOCUMENT CLASSIFICATION SYSTEM AND METHOD

BACKGROUND

Field

This application generally relates to document processing. In particular, this application describes a hierarchical document classification system and method.

Description of Related Art

Document data processing can be a time-consuming task. In some cases, the documents are processed manually. For example, teams of data entry personal may be tasked with determining the type of document and entering data specified in the document into an appropriate document system. The accuracy of the processing can depend on the skill of particular data entry personnel. But even the most skilled data entry personal are prone to making errors, especially when processing hundreds of documents a day. In addition, the whole process can be time-consuming and costly for organizations.

SUMMARY

In a first aspect, a method performed by a computing system comprises receiving, by a hierarchical document classification system (HDCS), a document that includes image data and textual data, wherein the document is associated with a document type. The HDCS determines a first machine learning (ML) classifier of the HDCS associated with the document type. The first ML classifier corresponds to one of an image-based ML classifier of the HDCS and a text-based ML classifier of the HDCS. The determined first ML classifier classifies the document as being associated with a particular class of document of a plurality of classes of documents. A second ML classifier associated with the class of document classifies the document as being associated with a particular subclass of a plurality of subclasses of the class of document. The HDCS communicates information that specifies the class and the subclass associated with the document to a terminal.

In a second aspect, a system comprises a memory that stores instruction code, and one or more processors in communication with the memory. The instruction code is executable by the one or more processors to perform operations comprising receiving a document that includes image data and textual data, wherein the document is associated with a document type, and determining a first machine learning (ML) classifier implemented by the system associated with the document type. The first ML classifier corresponds to one of an image-based ML classifier implemented by the system and a text-based ML classifier implemented by the system. The operations further comprise classifying, via the determined first ML classifier, the document as being associated with a particular class of document of a plurality of classes of documents, and classifying, via a second ML classifier associated with the class of document, the document as being associated with a particular subclass of a plurality of subclasses of the class of document. Information that specifies the class and the subclass associated with the document is communicated to a terminal.

In a third aspect, a non-transitory computer-readable medium includes instruction code. The instruction code is executable by one or more processors for causing the one or more processors to perform operations comprising receiving a document that includes image data and textual data, wherein the document is associated with a document type, and determining a first machine learning (ML) classifier implemented by the instruction code associated with the document type. The first ML classifier corresponds to one of an image-based ML classifier implemented by the instruction code and a text-based ML classifier implemented by the instruction code. The operations further comprise classifying, via the determined first ML classifier, the document as being associated with a particular class of document of a plurality of classes of documents, and classifying, via a second ML classifier associated with the class of document, the document as being associated with a particular subclass of a plurality of subclasses of the class of document. Information that specifies the class and the subclass associated with the document is communicated to a terminal.

BRIEF DESCRIPTION OF THE DRAWINGS

The accompanying drawings are included to provide a further understanding of the claims, are incorporated in, and constitute a part of this specification. The detailed description and illustrated examples described serve to explain the principles defined by the claims.

DETAILED DESCRIPTION

Implementations of this disclosure provide technological improvements that are particular to computing technology. In particular, these implementations reduce the computing power and time required by computing systems to classify documents. Further, various forms of machine learning logic are implemented and utilized in the classification of the documents. The implementations disclosed herein facilitate training the machine learning logic with a relatively small number of training documents, thus obviating the requirement for a large dataset of documents that would otherwise be required. This, in turn, reduces the storage requirements of the computing system.

Moreover, after training, examples of the machine learning logic are reconfigured to determine a class and subclass associated with a document. The machine learning logic is dynamically reconfigured depending on, for example, the source of the document (e.g., document from organization A) and based on the determined class. This, in turn, reduces the memory requirements associated with the implementation of the machine learning logic.

Various examples of systems, devices, and/or methods are described herein. Words such as "example" and "exemplary" that may be used herein are understood to mean "serving as an example, instance, or illustration." Any embodiment, implementation, and/or feature described herein as being an "example" or "exemplary" is not necessarily to be construed as preferred or advantageous over any other embodiment, implementation, and/or feature unless stated as such. Thus, other embodiments, implementations, and/or features may be utilized, and other changes may be made without departing from the scope of the subject matter presented herein.

Accordingly, the examples described herein are not meant to be limiting. It will be readily understood that the aspects of the present disclosure, as generally described herein, and illustrated in the figures, can be arranged, substituted, combined, separated, and designed in a wide variety of different configurations.

Further, unless the context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Moreover, terms such as "substantially" or "about" that may be used herein, are meant that the recited characteristic, parameter, or value need not be achieved exactly, but that deviations or variations, including, for example, tolerances, measurement error, measurement accuracy limitations and other factors known to one skilled in the art, may occur in amounts that do not preclude the effect the characteristic was intended to provide.

I. Introduction

As noted above, document data processing can be a time-consuming task prone to error, especially when performed manually by teams of data entry personnel. In some cases, a system can be configured to automatically read data from documents, which can be an improvement. For instance, documents having the same layout can be scanned via optical character recognition (OCR) logic. The OCR logic can be configured to associate specific regions of the document with specific fields. For example, the OCR logic can be configured to associate any characters within a specific rectangular region of the document with, for example, an account number. Unfortunately, this manner of data extraction requires the documents being OCR'd to conform to a strict template.

In another example, machine learning techniques can be utilized to classify documents. For example, a classifier can be utilized to classify type of document. Unfortunately, the batch size of documents required to train the classifier to be effective can be in hundreds of thousands. In many cases, there simply isn't enough training data available to train the classifier. Moreover, the memory requirements and processing power required to implement a classifier capable of classifying documents from a variety of sources can be immense.

Disclosed herein are examples of a hierarchical document classification system (HDCS) that overcomes these drawbacks. An example of the HDCS is configured to receive a document that includes image data and textual data. The document may have been previously associated with a particular document type. Examples of the HDCS implement several machine learning (ML) classifiers, and each classifier may be associated with a different document type. These classifiers include image-based ML classifiers and text-based ML classifiers.

For a particular document, the HDCS determines a first ML classifier (e.g., a particular image-based ML classifier or a particular text-based ML classifier) associated with the document based on the document type. The HDSC then uses that classifier to classify the document as being associated with a particular class of document of a plurality of classes of documents. The HDCS next determines a second ML classifier associated with the class of document determined above and uses the second ML to classify the document as being associated with a particular subclass of a plurality of subclasses of the class of document. The HDCS then communicates information that specifies the class determined by the first ML and the subclass determined by the second ML to a terminal.

As described in further detail below, the determination of the type of second ML classifier may be based on the class determined by the first ML classifier. For example, if the first ML classifier determines a particular document to be associated with class B, then a single text-based classifier (e.g., text-based classifier) may be implemented. Further implementation of the second ML classifier may occur after the determination of the class associated with the document. In this way, the memory requirements associated with the implementation of the various classifiers can be minimized. In some examples, only a single classifier is implemented. For example, a single ML classifier may be used to determine the class associated with the document. Then the same ML classifier type can be reconfigured to determine the subclass associated with the document. In this way, the memory requirements associated with the implementation of the various classifiers can be reduced even further.

Figure 1:
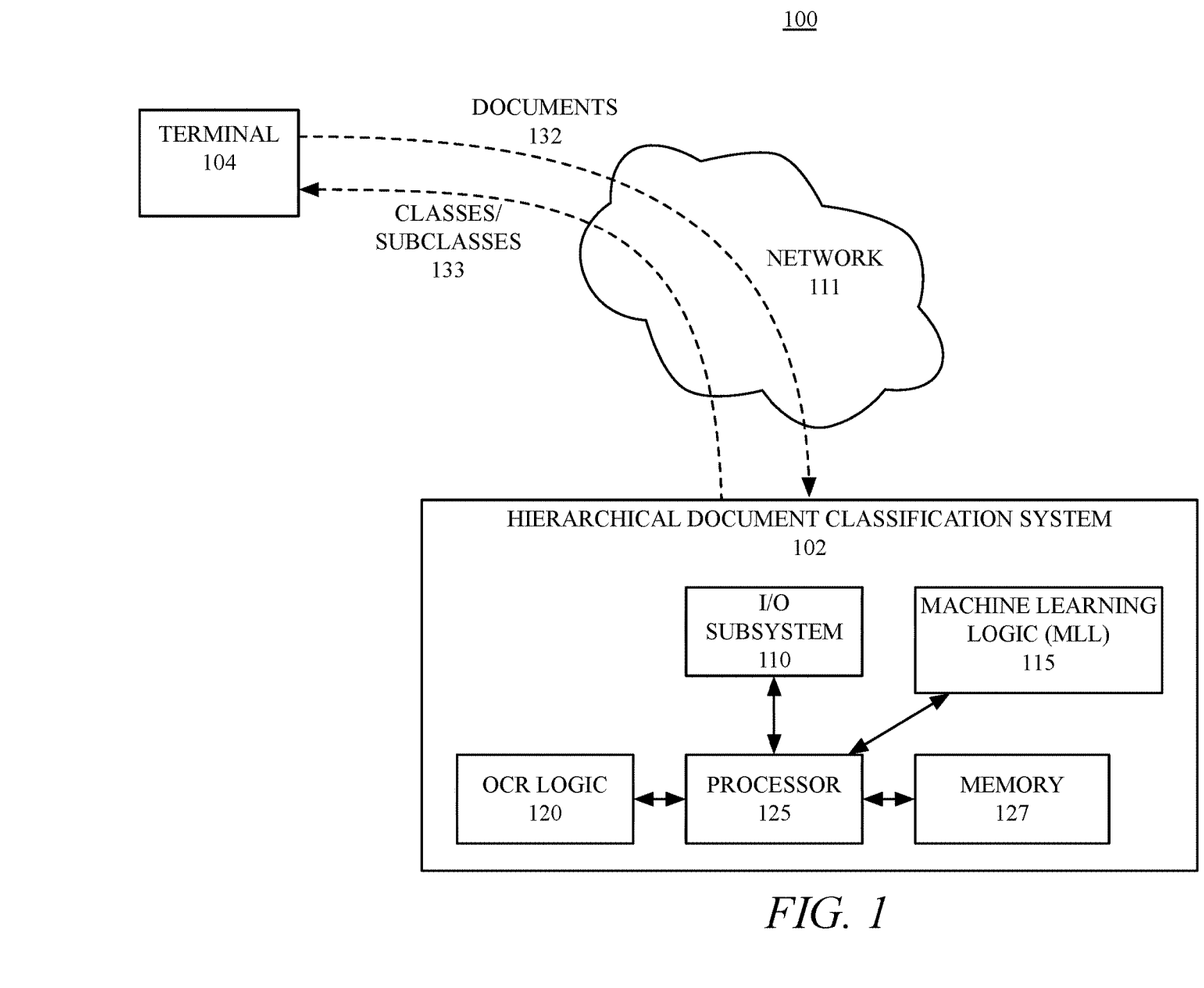
FIG. 1 illustrates an environment that includes various entities that cooperate to facilitate document classification, in accordance with an example.

FIG. 1 illustrates an example of an environment 100 that includes various entities that cooperate to facilitate document classification. Example entities of the environment 100 include a hierarchical document classification system (HDCS) 102 and a terminal 104. The various entities of the environment 100 can be configured to communicate with one another via a network 111, such as the Internet.

Referring to the figure, an example of the terminal 104 corresponds to a computer system such as a desktop computer, tablet, etc. The terminal 104 can correspond to a different type of computing device. An example of the terminal 104 has documents 132 stored thereon. Examples of the documents 132 are text-based and/or XML-based, etc. Other examples of the documents 132 are represented in a graphical format such as JPEG (Joint Photographic Experts Group), TIFF (Tagged Image File Format), PNG (Portable Network Graphics), etc.

An example of the terminal 104 executes a browser or other interface that facilitates communicating the documents 132 to the HDSC 102. In some examples, the terminal resides within an organization, such as a particular company. In some examples, the documents 132 are associated with a particular group of training documents that were previously received from the organization via the terminal 104 and used to train classification logic of the HDSC 102. In this regard, in some examples, the class and subclass of each training document are specified by the organization.

The HDSC 102 includes a memory 127, a processor 125, an input/output (I/O) subsystem 110, machine learning logic (MLL) 115, and optical character recognition (OCR) logic. Examples of the HDSC 102 include other subsystems. As will be described in further detail below, the memory 127 stores instruction code that is executable by the processor 125 for causing the processor 125 to perform various operations.

As noted above, the processor 125 is in communication with the memory 127. The processor 125 is configured to execute instruction code stored in the memory 127. The instruction code facilitates performing, by the HDSC 102, various operations that facilitate classification of a document 132. In this regard, the instruction code can cause the processor 125 to control and coordinate various activities performed by the different subsystems of the HDSC 102. An example of the processor 125 corresponds to a stand-alone computer system such as an Intel®, AMD®, or ARM® based computer system or a different computer system and can include application-specific computer systems. An example of the computer system includes an operating system, such as Microsoft Windows®, Linux, Unix®, Mac OS®, or a different operating system.

An example of the I/O subsystem 110 includes one or more input, output, or input/output interfaces and is configured to facilitate communications with entities outside of the HDSC 102, such as the terminal 104. In this regard, an example of the I/O subsystem 110 is configured to dynamically determine the communication methodology utilized by entities of the environment 100 and to communicate information to the entities with an interface that uses a determined communication methodology. For example, the I/O subsystem 110 can determine that a first entity utilizes a RESTful API and can, therefore, communicate with the entity using an interface that uses a RESTful communication methodology.

An example of the MLL 115 corresponds to hardware, software, or a combination thereof that is specifically configured to implement or assist in the implementation of various supervised and unsupervised machine learning models. An example of the MLL 115 implements a Holt-Winters algorithm, exponential time smoothing (ETS) algorithm, an artificial neural network (ANN), a recurrent neural network (RNN), a seasonal autoregressive moving average (SA-RIMA) algorithm, a network of long short-term memories (LSTM), and/or a gated recurring unit (GRU) algorithm. Examples of the MLL 115 can implement other machine learning logic.

An example of the OCR logic 120 can be configured to receive an image specified in terms of pixels and to generate metadata that specifies the text content of the image. For instance, an example of the OCR logic 120 is configured to generate metadata from images specified in a graphical format such as JPEG (Joint Photographic Experts Group), TIFF (Tagged Image File Format), PNG (Portable Network Graphics), etc. An example of the OCR logic 120 includes or is in communication with a library that includes various logic modules specifically configured to perform OCR operations, such as the ABBYY FineReader library by ABBYY Co.

It is contemplated that any of the subsystems referenced herein can correspond to a stand-alone computer system such as an Intel®, AMD®, or Arm® based computer system or a different computer system and can include application-specific computer systems. The computer systems can include an operating system, such as Microsoft Windows®, Linux, Unix®, or another operating system. It is also contemplated that operations performed by the various subsystems can be combined into a fewer or greater number of subsystems to facilitate speed scaling, cost reductions, etc. For instance, an example of the HDSC 102 includes multiple processors utilized to perform specific tasks.

Figure 2:
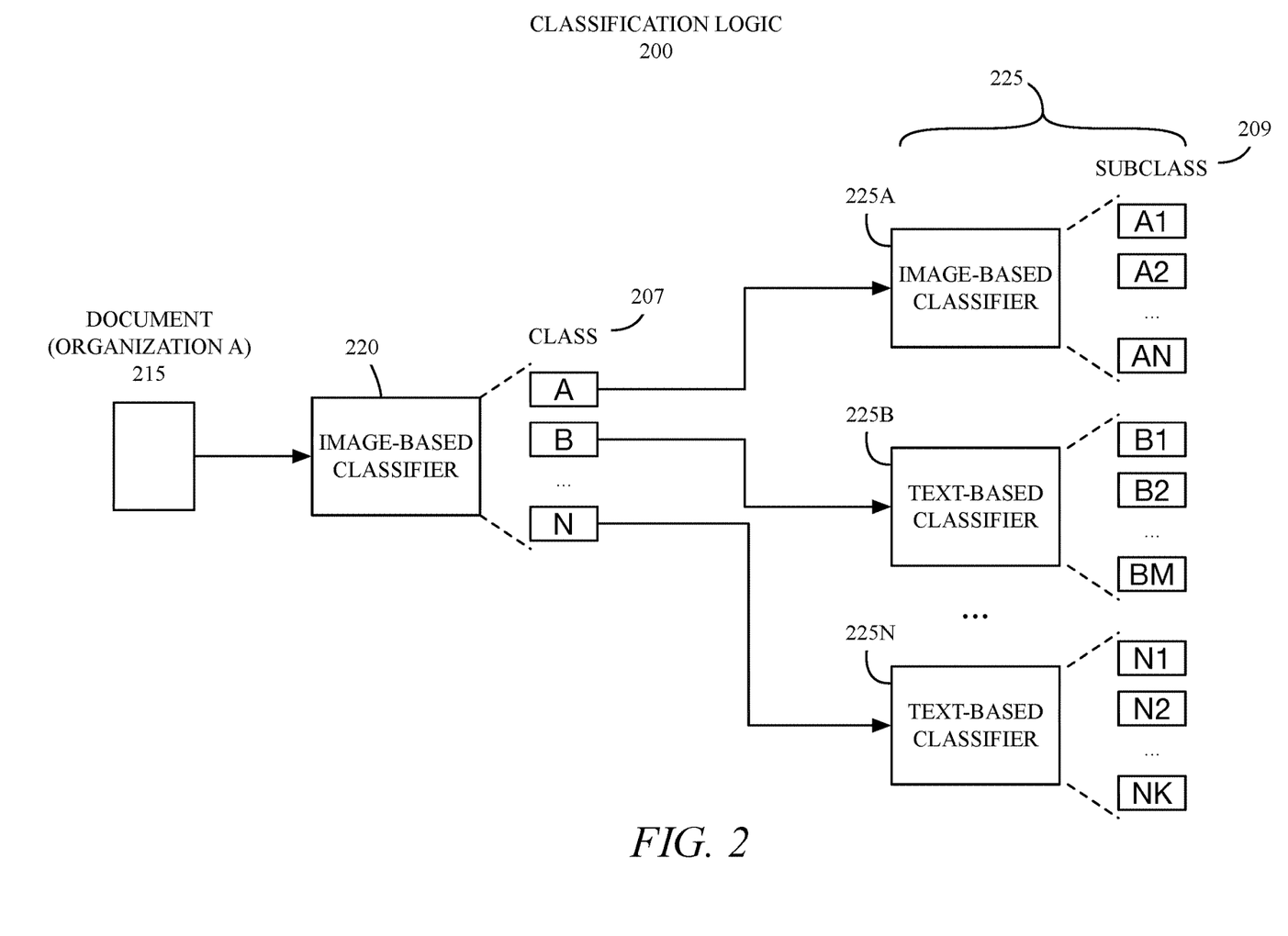
FIG. 2 illustrates classification logic associated with a particular group or type of document that is implemented by machine learning logic (MLL) of a hierarchical document classification system (HDSC) of the environment, in accordance with an example.

FIG. 2 illustrates classification logic 200 associated with a particular group of documents (e.g., documents from organization A) that is implemented by an example of the MLL 115 of the HDSC 102. The classification logic 200 is configured to determine a class and subclass of a document that is associated with the group of documents. For instance, an example of the document can be associated with document classes such as billing invoices, financial documents, business reports, compliance and regulatory documents, employment agreements, transactional documents, etc. An example of the document can be further associated with a particular subclass. For example, a document associated with the invoice class can be further associated with the subclass versions 1, 2, 3, etc., of the invoice class.

Referring to the figure, the classification logic 200 includes a single or first ML classifier 220 and second ML classifiers 225, one for each output of the first ML classifier 220. The classification logic 200 for a particular document is configured during a training stage. That is, the determination as to the type of classifier (e.g., image-based classifier or text-based classifier) to use for the first ML classifier 205 and types of classifiers (e.g., image-based classifiers or text-based classifiers) to use for the second ML classifiers 210, along with the corresponding weights of neural nets associated with these classifiers, is determined when training the MLL 115 to classify documents associated with a particular group of documents.

In examples, the configuration of the classification logic 200 is different for different groups or types of documents (e.g., documents belonging to different organizations). For example, the type of classifiers to use for the first ML classifier 220 and the types of classifiers to use for the second ML classifiers 225, along with the weights for these classifiers, are different for different groups or types of documents. In this regard, an example of the HDSC 102 includes a database with records that map particular groups or types of documents to particular classification logic configurations. The records facilitate reconfiguring the MLL to classify documents associated with various groups or types of documents.

In the illustrated example, after training the classification logic 200 to classify documents of, for example, Group A, the first ML classifier 220 is configured to be an image-based classifier. The weights of the first ML classifier 220 are adjusted (via training) to classify a document associated with document type A as belonging to one of classes A, B, . . . N. Stated differently, class output nodes 207 of the first ML classifier 220 specify probability's that the document belongs to a corresponding class. The class associated with the class output node 207 having the highest probability is assumed to be the class associated with the document 215 being classified.

The second ML classifiers 225 can correspond to one or more different classifiers, one for each class output node 207 of the first ML classifier 220. In the illustrated example, after training the classification logic 200 to classify documents of, for example, Group A, a first classifier 225A of the second ML classifiers 225 is specified to be an image-based classifier. A second classifier 225B of the second ML classifiers 225 is specified to be a text-based classifier. The Nth classifier 225N of the second ML classifiers 225 is specified to be a text-based classifier.

The subclass output nodes 209 of each of the second ML classifiers 225 specify probabilities that a particular document belongs to a particular subclass.

An example of the image-based classifier corresponds to a convolutional neural network (CNN). In this regard, an image that corresponds to a document 214 associated with a particular document type (e.g., organization A) is input to an input layer of the image-based classifier. More specifically, the image of the document 214 is broken into small sub-images, and the sub-images and the input of the CNN is a tensor with shape (number of sub-images)×(sub-image height)×(sub-image width)×(sub-image depth).

Another example of the image-based classifier corresponds to a fully connected feedforward neural network. In this case, the classifier may correspond to a neural network having an input layer of nodes for receiving pixels of the image of the document, a hidden layer of nodes that specify features associated with the document, and an output layer of nodes that specify the probabilities of the document being associated with a particular class.

Examples of the text-based classifier correspond to long-short-term memory (LSTM) based classifiers, convolutional neural networks (CNN), word embedders, etc. In this regard, optical character recognition (OCR) can be performed on the document to extract the textual features associated with the document 215. Examples of these features specify the characters of the documents and their respective locations within the document. Examples of the features can specify whether the characters are numeric or alphanumeric, whether the text is associated with a pattern (e.g., a phone number pattern xxx-xxx-xxxx), etc.

It should be noted that while three second ML classifier 225 instances are illustrated in FIG. 2, when processing a particular document 215, there may be only a single instance of a second ML classifier 225. The determination of the type of second ML classifier 225 may be based on the class determined by the first ML classifier 220. For example, if the first ML classifier 220 determines a particular document 215 to be associated with class B, then a single text-based classifier (e.g., text-based classifier 225B) may be implemented. In this regard, the implementation of the second ML classifier 225 may occur after the determination of the class associated with the document. In this way, the memory requirements associated with the implementation of the various classifiers can be minimized. Moreover, in some examples, only a single classifier needs to be implemented. For example, a single ML classifier may be used to determine the class associated with the document. Then the same ML classifier can be reconfigured to determine the subclass associated with the document. In this way, the memory requirements associated with the implementation of the various classifiers can be reduced even further.

Figure 3:
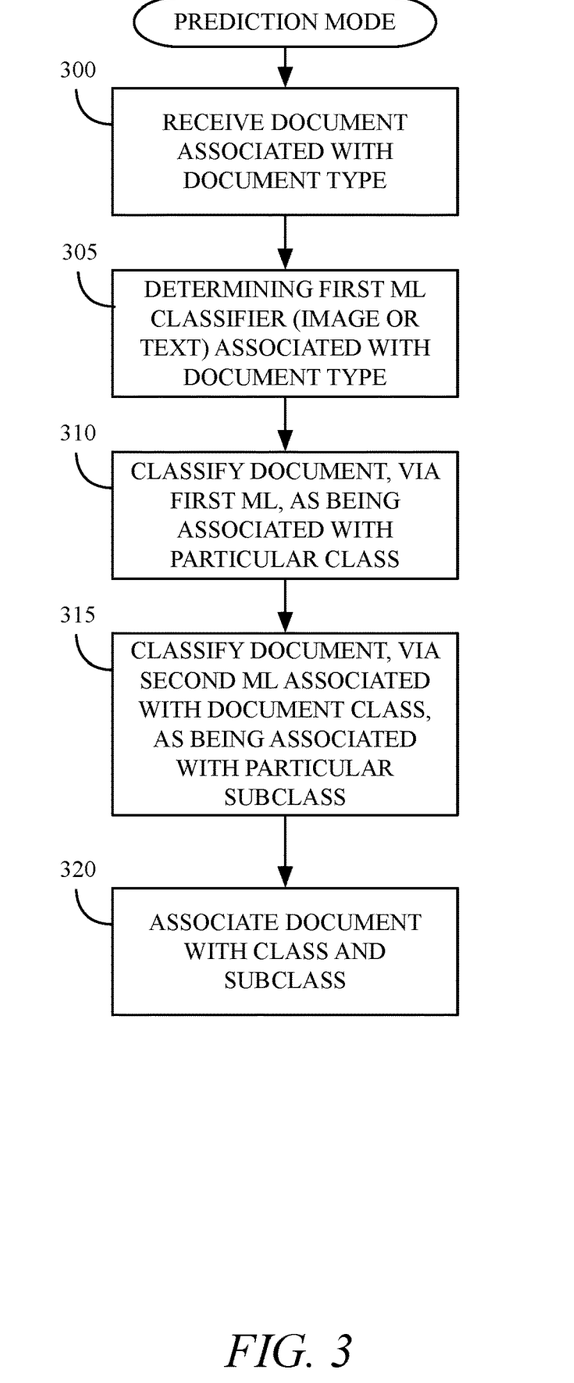
FIG. 3 illustrates operations performed by the HDSC when classifying a particular document, in accordance with an example.

FIG. 3 illustrates operations performed by an example of the HDSC 102 when classifying a document 215 associated with a particular document type (e.g., documents associated with organization A). It should be understood that one or more of the operations can be implemented in instruction code that can be stored in the memory of the respective systems. The instruction code can be executed by one or more processors of these systems, alone or in combination with other subsystems of these systems, to cause the respective systems to perform the operations illustrated in the figures.

At block 300, a document 215 associated with a group of documents (e.g., documents associated with a particular document type) is received. For example, a user, via a terminal 104 at organization "A" can communicate the document 132 to the HDSC 102. An example of the document 132 can be represented in a graphical format such as JPEG (Joint Photographic Experts Group), TIFF (Tagged Image File Format), PNG (Portable Network Graphics), etc. An example of the document 215 can correspond to an invoice, which may include information related to various services provided by a service provider. For example, the service provider name can be specified in a first region of the document 215, an invoice date and customer account number can be specified in a second region of the document 215. A total amount owed can be specified in a third region of the document 215. In some examples, dates of services, services provided, costs for the services, taxes, fees, etc., are specified in the document 215.

At block 305, a first ML classifier 220 associated with the document is determined. As noted above, an example of the HDSC 102 includes a database with records that map particular groups of documents (e.g., documents associated with a particular document type) to different classification logic configurations. The records facilitate reconfiguring the classification logic 200 to classify documents associated with different groups or types of documents. In an example, a record associated with the document type associated with the documents is selected, and the classification logic 200 is configured according to the configuration information specified in the record. An example of the record specifies the classifier (e.g., image-based or text-based) for the first ML classifier 220 and the classifiers for the second ML classifiers 225. An example of the record further specifies the values for the weights of these classifiers.

At block 310, the document 215 is classified using the first ML classifier 220. For example, the data associated with the document 215 is input into the first ML classifier 220 determined above. The first ML classifier 220 classifies the document as being associated with a particular class (e.g., class A, B . . . , N).

At block 315, the document 215 is classified via a second ML classifier 210. As noted above, each class output node 207 of the first ML classifier 220 is mapped to an input of a particular second ML classifier 225 associated with the class output node 207. The mapping is determined during the training of the classification logic 200. In an example, the mapping is specified in the database record described above, which, as noted above, facilitates reconfiguring the classification logic 200 to classify documents associated with different groups or types of documents.

For example, as shown in the example of FIG. 2, a document 215 classified as belonging to class A is further classified by an image-based classifier 225A that is trained to predict the subclass associated with documents associated with class A. A document 215 classified as belonging to class B is further classified by a text-based classifier 225B that is trained to predict the subclass associated with documents associated with class B. A document 215 classified as belonging to class N is further classified by a text-based classifier 225N that is trained to predict the subclass associated with documents associated with class N.

As noted above, each class output node 207 of the first ML classifier 220 corresponds to a probability that a particular document is associated with a particular class. In an example, the class output node 207 of the first ML classifier 220 having the highest probability indicates the second ML classifier 225 to use in determining the subclass associated with the document 215. For example, the class output nodes 207 can specify the following probabilities: A=0.75, B=0.20, and N=0.5. Because A has the highest probability, the second ML classifier 225A is mapped to class output node A and is utilized to predict the subclass.

At block 320, the document 215 is associated with class predicted by the first ML classifier 220 and the subclass predicted by the second ML classifier 225. Following the example above, if the subclass output nodes 209 specify the following probabilities: A1=0.20, A2=0.75, and An=0.50, the document is associated with class A and subclass A2. Class/subclass information 133 associated with the document can be communicate to the terminal 104. In some examples, the class/subclass information can be stored as metadata within the document.

Figure 4:
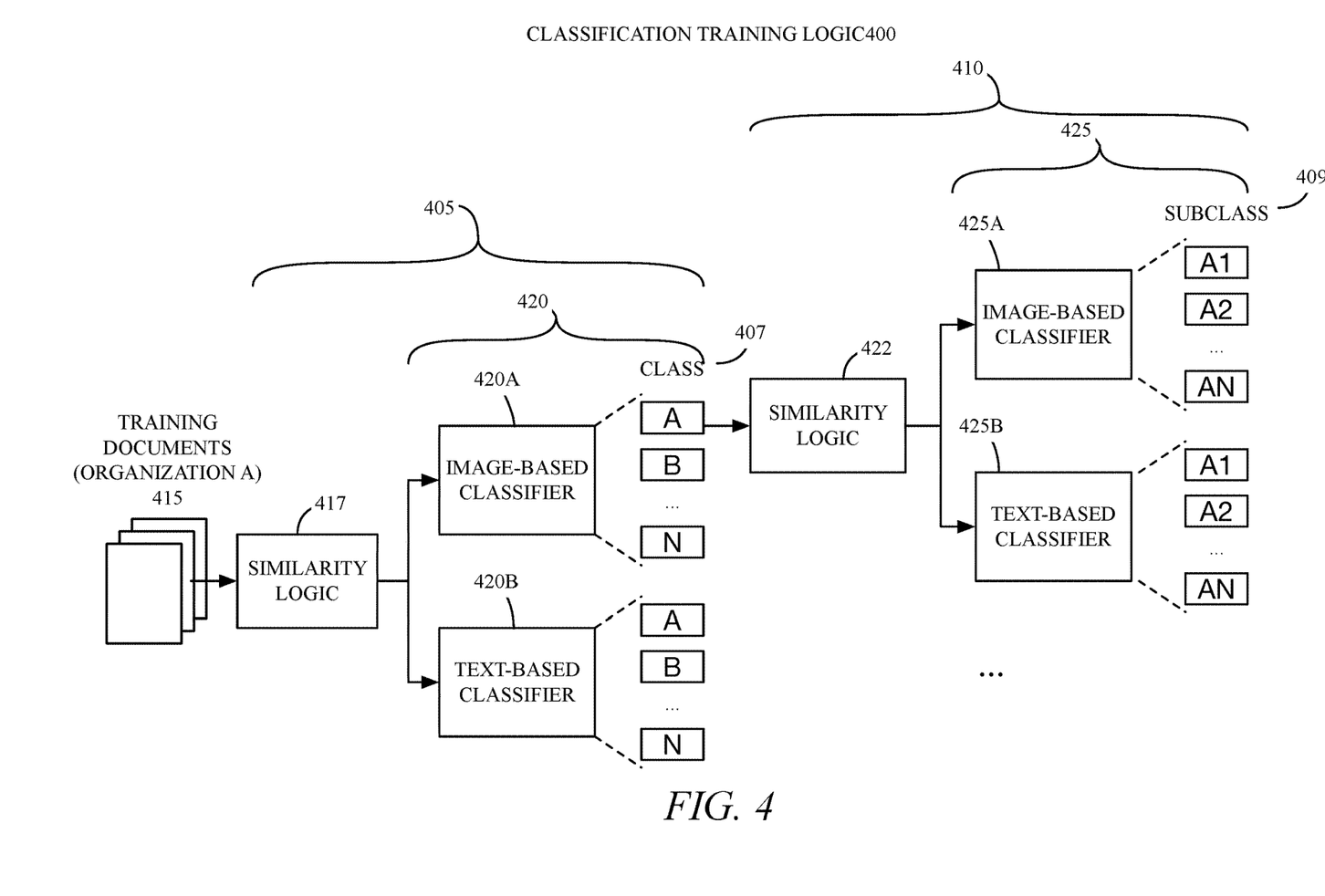
FIG. 4 illustrates classification training logic implemented by the MLL to facilitate training the classification logic to predict the class and subclass associated with a document associated with a group of documents, in accordance with an example.

FIG. 4 illustrates classification training logic 400 implemented by the MLL 115 to facilitate training the classification logic 200 to predict the class and subclass associated with a document associated with a group or type of documents. Referring to the figure, the classification training logic 400 includes first training logic 405 and second training logic 410. The first training logic 405 includes first similarity logic 417 and a first ML classifier 420. The first ML classifier 420 corresponds to and/or includes a first image-based ML classifier 420A and/or a first a text-based ML classifier 420B. The second training logic 410 includes second similarity logic 422 and a second ML classifier 425. The second ML classifier 425 corresponds to and/or includes a second image-based ML classifier 425A and/or a second text-based ML classifier 425B.

In operation, a group of training documents 415, such as those associated with a particular organization, may be communicated to the HDCS 102 from a terminal 104 of the organization. The group of training documents 415 can include, for example, billing invoices, financial documents, business reports, compliance and regulatory documents, employment agreements, transactional documents, etc. Each of these types of documents can be considered a class of documents. Within each class of document, there can be subclasses. For example, within the class of billing invoice documents, there can be different versions or types of invoices. Each of these versions or types can be considered a subclass of an invoice document. In an example, the class and subclass associated with each training document are known ahead of time.

The first similarity logic 417 determines a text-similarity score and an image-similarity score associated with training documents 415. The text-similarity score indicates a degree of textual relatedness between the training documents 415. The image-similarity score indicates a degree of graphical relatedness between the training documents 415.

In an example, documents are more similar from an image-based perspective when the documents include graphical features such as tables, entry boxes, logos, etc. and where these features are similarly positioned between the various training documents. In some examples, the determination of the image-similarity score involves extracting, via a pre-trained model, features of each training document of the group. A normalized similarity function is then used to determine the distance between features of each of the training documents of the group.

In an example, documents are more similar from a text-based perspective when the documents include similar text, similar phrases, etc. In some examples, the determination of the text-similarity score involves defining a set of keywords associated with the group of training documents such as "account number," "invoice," "amount owed," etc. A normalized similarity function then determines a distance between the set of keywords and words of the training documents. Examples of the normalized similarity function correspond to a Euclidean distance function, a cosine similarity function, etc. In some examples, a clustering algorithm is used to determine the similarity score.

When the text-similarity score is greater than the image-similarity score, the first text-based ML classifier 420B is determined to be the best type of classifier to use as the first ML classifier 420. A text type ML classifier may be selected because such a classifier may be best suited at classifying documents having a high degree of textual similarity. Otherwise, when the image-similarity score is greater than the text-similarity score, the first image-based ML classifier 420A is determined to be the best type of classifier to use as the first ML classifier 420. An image type ML classifier may be selected because such a classifier may be best suited at classifying documents having a high degree of graphical similarity.

After selection of the first ML classifier 420 (i.e., text-based or image-based), the first ML classifier 420 is trained with the training documents 415 to classify the documents as belonging to different classes. For example, the weights of the first ML classifier 420 are adjusted (e.g., via backpropagation) to drive the probabilities associated with the class output nodes 407 of the first ML classifier 420 to correctly predict each of the training documents 415.

The second similarity logic 422 determines a text similarity score and an image-similarity score associated with a subset of training documents 415 that belong to the same class of training document. For example, after training of the first ML classifier 420, a first subset of the training documents 415 are classified as belonging to class A, a second subset of the training documents 415 are classified as belonging to class B, etc. For each class output node 407 of the first ML classifier 420, the second similarity logic 422 determines the text-similarity score and the image-similarity score associated with the subset of training documents associated with the corresponding class. In an example, training documents 415 associated with a first class (e.g., class A) may be more similar from a graphical perspective, training documents associated with a second class (e.g., class B) may be more similar from a textual perspective, etc.

When the text-similarity score for a particular class of training documents is greater than the image-similarity score, the second text-based ML classifier 425B is determined to be the best type of classifier to use as the second ML classifier 425 for determining the subclass associated with that class of training documents. Otherwise, when the image-similarity score is greater than the text-similarity score, the second image-based ML classifier 425A is determined to be the best type of classifier to use as the second ML classifier 425 for determining the subclass associated with that class of training documents.

After selection of the second ML classifiers 425 (i.e., text-based or image-based) to associate with the various class output nodes 207 of the first ML classifier 420, the second ML classifiers 425 are trained with the training documents 415 belonging to associated classes to further classify the documents as belonging to different subclasses. For example, the weights of the second ML classifiers 425 are adjusted (e.g., via backpropagation) to drive the probabilities associated with the subclass output nodes 409 of the second ML classifier 425 to correctly predict the subclass of each class of training documents 415.

Figure 5:
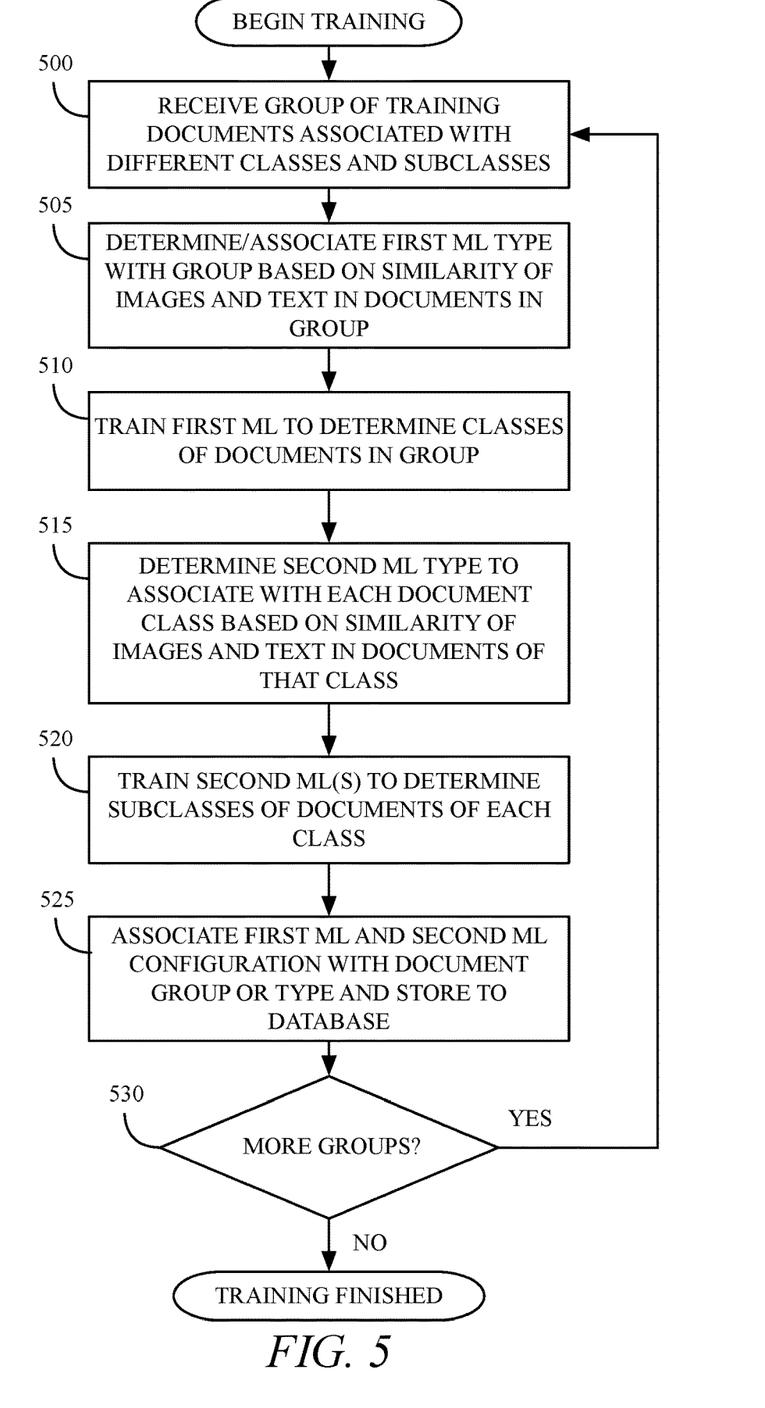
FIG. 5 illustrates operations performed by the HDSC when training the classification logic implemented by the MLL to determine a class and subclass associated with a particular document, in accordance with an example.

FIG. 5 illustrates operations performed by an example of the HDSC 102 when training the classification logic 200 implemented by the MLL 115 to determine a class and subclass associated with a particular document. It should be understood that one or more of the operations can be implemented in instruction code that can be stored in the memory of the respective systems. The instruction code can be executed by one or more processors of these systems, alone or in combination with other subsystems of these systems, to cause the respective systems to perform the operations illustrated in the figures.

At block 500, a group of training documents 415 associated with different classes and subclasses is received. For example, training documents 415 associated with a particular organization may be communicated to the HDCS 102 from a terminal 104 of the organization. The training documents 415 can include, for example, billing invoices, financial documents, business reports, compliance and regulatory documents, employment agreements, transactional documents, etc. Each of these types of documents can be considered a class of document. Within each class of document, there can be subclasses. For example, within the class of billing invoice document, there can be different versions or types of invoices. Each of these versions or types can be considered a subclass of an invoice document. The class and subclass associated with each training document are generally known ahead of time.

At block 505, a first ML classifier 420 is associated with the group of training documents 415 based on whether the documents of the group are more graphically-related or more textually related. For example, similarity logic 417 of the first training logic 405 determines a text-similarity score and an image-similarity score associated with the group of training documents 415. As noted above, the text-similarity score indicates a degree of textual relatedness between the group of training documents 415. The image-similarity score indicates a degree of graphical relatedness between the group of training documents 415. When the text-similarity score is greater than the image-similarity score, the first text-based ML classifier 420B is determined to be the best type of classifier to use as the first ML classifier 420. Otherwise, when the image-similarity score is greater than the text-similarity score, the first image-based ML classifier 420A is determined to be the best type of classifier to use as the first ML classifier 420.

At block 510, the first ML classifier 420 is trained to classify the group of training documents 415. For instance, in an example, the weights of the first ML classifier 420 are adjusted (e.g., via backpropagation) to drive the probabilities associated with the class output nodes 407 of the first ML classifier 420 to correctly predict each of the training documents 415. For example, the weights may be adjusted so that a first class output (e.g., class A) is associated with invoices, a second class output (e.g., class B) is associated with financial documents, etc.

At block 515, a second ML classifier 425 is associated with each document class based on whether the documents of the class are more graphically-related or more textually related to one another. In an example, second similarity logic 422 determines a text-similarity score and an image-similarity score associated with training documents of each class. For instance, after training of the first ML classifier 420, a first subset of the training documents 415 are classified as belonging to class A, a second subset of the training documents 415 are classified as belonging to class B, etc.

For each class output node 407 of the first ML classifier 420, the second similarity logic 422 determines the text-similarity score and the image-similarity score associated with the subset of training documents 415 associated with the corresponding class. In an example, training documents 415 associated with a first class (e.g., class A) may be more similar from a graphical perspective, training documents associated with a second class (e.g., class B) may be more similar from a textual perspective, etc.

In an example, these operations are performed for each class output node 407 of the first ML classifier 420. Afterwards, the second ML classifier 425 associated with some classes (i.e., class output node 407) may correspond to an image-based classifier 425A while the second ML classifier 425 associated with other classes may correspond to a text-based classifier 425B.

At block 520, the second ML classifiers 425 are trained to classify the group of training documents 415. For instance, in an example, the second ML classifiers 425 are trained via backpropagation to adjust weights of the second ML classifiers 425 to drive the subclass output layer nodes 409 to make correct predictions. For example, suppose a first class output node 407 (e.g., class A) of the first ML classifier 420 is associated with invoices, the second ML classifier 425 that is associated with the first class output node 407 is trained so that the first subclass output node (e.g., class A1) is associated with a first version of the invoices, a second subclass output node (e.g., class A2) is associated with a second version of the invoices, etc.

At block 525, the configuration of the first ML classifier 420 and the second ML classifiers 425 can be associated with the group of training documents 415 and stored to a database record. For example, the record may specify the first ML classifier 420 for a particular group of training documents 415 to be an image-based classifier. The record may specify the second ML classifiers 425 for each class output node 407 of the first ML classifier 420. The weights for the respective classifiers may be specified in the record. Storing this information in the record facilitates configuring the classification logic 200 implemented by the MLL 115 to determine the class and subclass for newly received documents known to be associated with groups of training documents that were used to train the classification logic 200. For example, if a new document is received from a particular organization, the document type associated with the document is determined (e.g., based on the organization). The classification logic 200 can then be configured according to information in the record. Afterwards, the document can be processed via the configured classification logic 200 to determine the class and subclass associated with the document.

If at block 530, there are additional groups of training documents 415, the operations repeat from block 500. For example, a second group of training documents 415 associated with a different organization can be processed via the operations described above.

Figure 6:
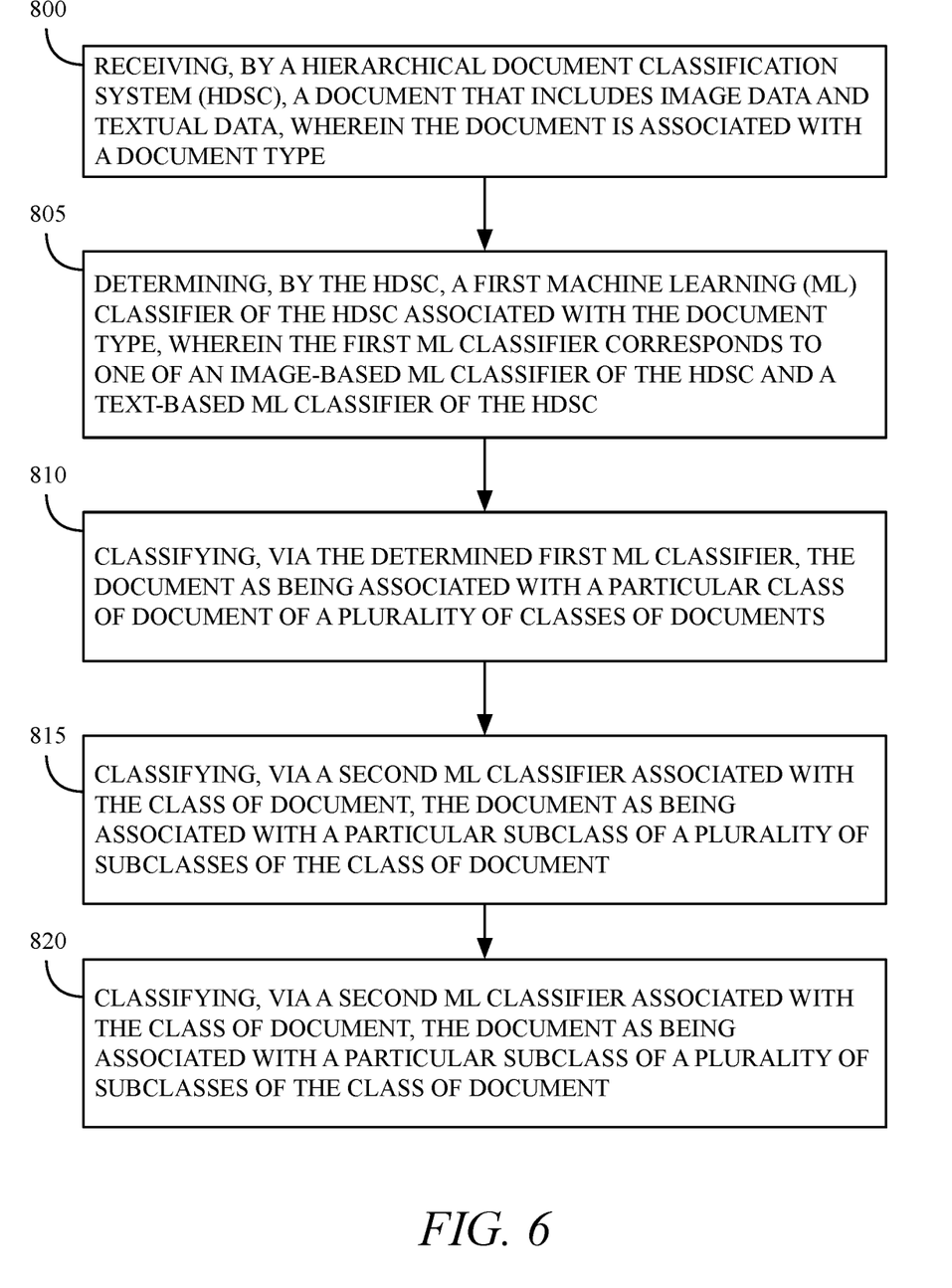
FIG. 6 illustrates a computer-implemented method that can be performed by the HDSC, in accordance with an example.

FIG. 6 illustrates an example of a computer-implemented method that can be performed by one or more examples of the HDSC. Block 800 involves receiving, by a hierarchical document classification system (HDSC), a document that includes image data and textual data, wherein the document is associated with a document type.

Block 805 involves determining, by the HDSC, a first machine learning (ML) classifier of the HDSC associated with the document type, wherein the first ml classifier corresponds to one of an image-based ml classifier of the HDSC and a text-based ml classifier of the HDSC.

Block 810 involves classifying, via the determined first ml classifier, the document as being associated with a particular class of document of a plurality of classes of documents.

Block 815 involves classifying, via a second ML classifier associated with the class of document, the document as being associated with a particular subclass of a plurality of subclasses of the class of document.

Block 820 involves classifying, via a second ML classifier associated with the class of document, the document as being associated with a particular subclass of a plurality of subclasses of the class of document In some examples, determining the first ML classifier of the HDCS associated with the document type involves determining a text-similarity score and an image-similarity score associated with training documents associated with the document type. The text-similarity score indicates a degree of textual relatedness between the training documents associated with the document type, and the image-similarity score indicates a degree of graphical relatedness between the training documents associated with the document type. When the text-similarity score is greater than the image-similarity score, the ML classifier associated with the document type is determined to be the text-based ML classifier of the HDCS. When the image-similarity score is greater than the text-similarity score, the ML classifier associated with the document type is determined to be the image-based ML classifier of the HDCS. The ML classifier associated with the document type is trained with the training documents associated with the document type.

In some examples, classifying the document as being associated with the particular subclass of the plurality of subclasses of the class of document further involves selecting a subset of documents of the training documents associated with the document type that are associated with the particular class. A text-similarity score and an image-similarity score associated with the subset of documents is determined. The text-similarity score indicates a degree of textual relatedness between the subset of documents and the image-similarity score indicates a degree of graphical relatedness between the subset of documents. When the text-similarity score is greater than the image-similarity score, the second ML classifier associated with the class of document is determined to be the text-based ML classifier of the HDCS. When the image-similarity score is greater than the text-similarity score, the second ML classifier associated with the class of document is determined to be the image-based ML classifier of the HDCS. The second ML classifier is trained with the subset of documents.

In some examples, determining the text-similarity score associated with the training documents associated with the document type further involves defining a set of keywords associated with the document type; and determining, via a normalized similarity function, a distance between the set of keywords and words of the training documents.

In some examples, the normalized similarity function corresponds to one of: a Euclidean distance function, or a cosine similarity function.

In some examples, determining the image-similarity score associated with training documents associated with the document type further involves extracting, via a pre-trained model, features of each training document associated with the document type; and determining, via a normalized similarity function, a distance between features of each of the training documents associated with the document type.

In some examples, the image-based ML classifier corresponds to a convolution classifier.

In some examples, the text-based ML classifier corresponds to one of: a long-short-term (LSTM) classifier, a convolutional neural network (CNN), or a word embedder.

Figure 7:
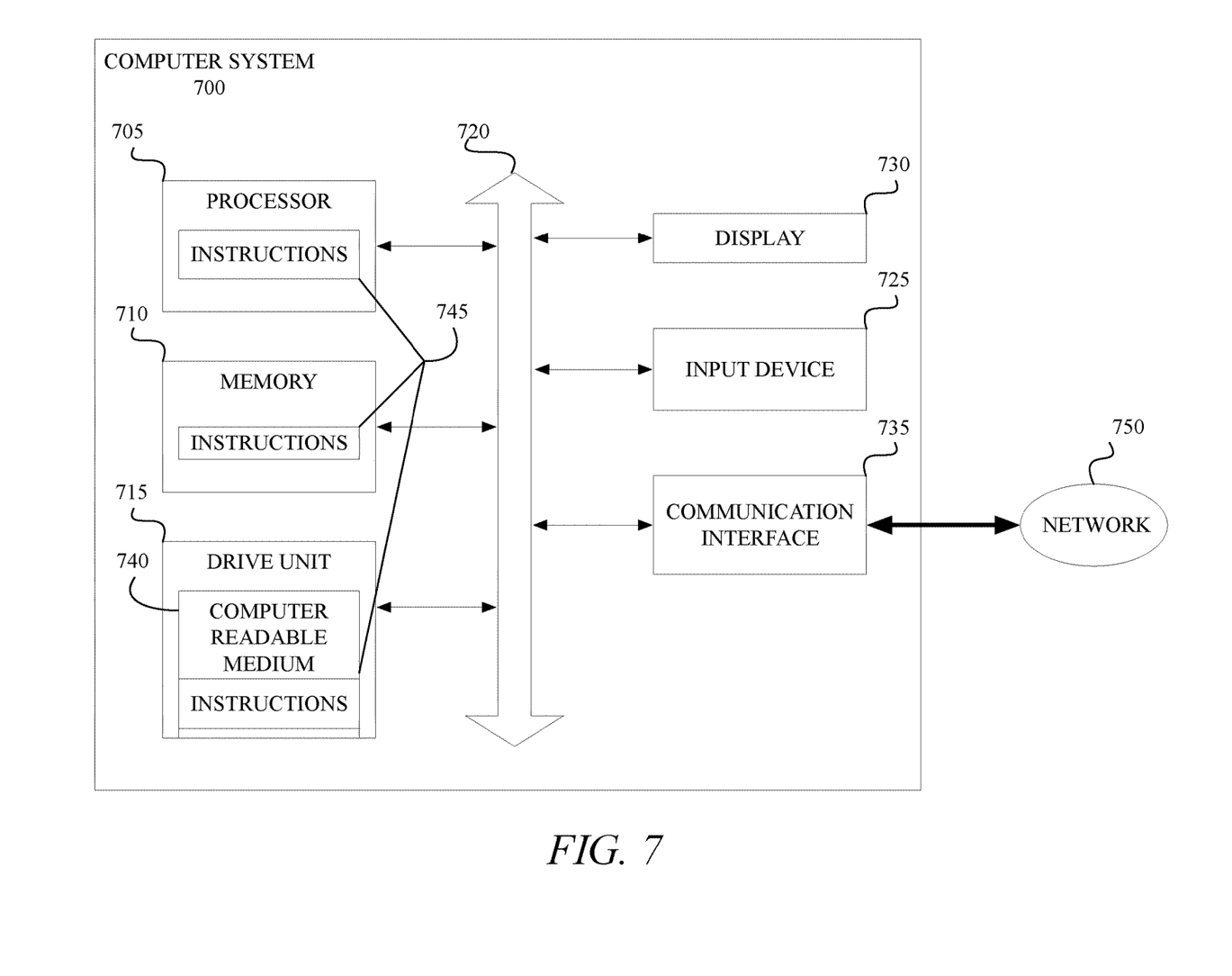
FIG. 7 illustrates a computer system that can form part of or implement any of the systems or devices of the environment, in accordance with an example.

FIG. 7 illustrates an example of a computer system 700 that can form part of or implement any of the systems and/or devices described above. The computer system 700 can include a set of instructions 745 that the processor 705 can execute to cause the computer system 700 to perform any of the operations described above. An example of the computer system 700 can operate as a stand-alone device or can be connected, e.g., using a network, to other computer systems or peripheral devices.

In a networked example, the computer system 700 can operate in the capacity of a server or as a client computer in a server-client network environment, or as a peer computer system in a peer-to-peer (or distributed) environment. The computer system 700 can also be implemented as or incorporated into various devices, such as a personal computer or a mobile device, capable of executing instructions 745 (sequential or otherwise), causing a device to perform one or more actions. Further, each of the systems described can include a collection of subsystems that individually or jointly execute a set, or multiple sets, of instructions to perform one or more computer operations.

The computer system 700 can include one or more memory devices 710 communicatively coupled to a bus 720 for communicating information. In addition, code operable to cause the computer system to perform operations described above can be stored in the memory 710. The memory 710 can be random-access memory, read-only memory, programmable memory, hard disk drive, or any other type of memory or storage device.

The computer system 700 can include a display 730, such as a liquid crystal display (LCD), a cathode ray tube (CRT), or any other display suitable for conveying information. The display 730 can act as an interface for the user to see processing results produced by processor 705.

Additionally, the computer system 700 can include an input device 725, such as a keyboard or mouse or touch-screen, configured to allow a user to interact with components of system 700.

The computer system 700 can also include a disk or optical drive unit 715. The drive unit 715 can include a computer-readable medium 740 in which the instructions 745 can be stored. The instructions 745 can reside completely, or at least partially, within the memory 710 and/or within the processor 705 during execution by the computer system 700. The memory 710 and the processor 705 also can include computer-readable media as discussed above.

The computer system 700 can include a communication interface 735 to support communications via a network 750. The network 750 can include wired networks, wireless networks, or combinations thereof. The communication interface 735 can enable communications via any number of wireless broadband communication standards, such as the Institute of Electrical and Electronics Engineering (IEEE) standards 802.11, 802.12, 802.16 (WiMAX), 802.20, cellular telephone standards, or other communication standards.

Accordingly, methods and systems described herein can be realized in hardware, software, or a combination of hardware and software. The methods and systems can be realized in a centralized fashion in at least one computer system or in a distributed fashion where different elements are spread across interconnected computer systems. Any kind of computer system or other apparatus adapted for carrying out the methods described herein can be employed.

The methods and systems described herein can also be embedded in a computer program product, which includes all the features enabling the implementation of the operations described herein and which, when loaded in a computer system, can carry out these operations. Computer program, as used herein refers to an expression, in a machine-executable language, code or notation, of a set of machine-executable instructions intended to cause a device to perform a particular function, either directly or after one or more of a) conversion of a first language, code, or notation to another language, code, or notation; and b) reproduction of a first language, code, or notation.

While the systems and methods of operation have been described with reference to certain examples, it will be understood by those skilled in the art that various changes can be made and equivalents can be substituted without departing from the scope of the claims. Therefore, it is intended that the present methods and systems not be limited to the particular examples disclosed, but that the disclosed methods and systems include all embodiments falling within the scope of the appended claims.

The invention claimed is:

1. A method performed by a computing system, the method comprising:
    receiving, by a hierarchical document classification system (HDCS), a document that includes image data and textual data, wherein the document is associated with a document type;
    determining, by the HDCS, a first machine learning (ML) classifier of the HDCS associated with the document type, wherein the first ML classifier corresponds to one of an image-based ML classifier of the HDCS and a text-based ML classifier of the HDCS, and wherein determining the first ML classifier of the HDCs associated with the document type comprises:
        determining a text-similarity score and an image-similarity score associated with training documents associated with the document type, wherein the text-similarity score indicates a degree of textual relatedness between the training documents associated with relatedness between the training documents associated with the document type;
        when the text-similarity score is greater than the image-similarity score, determining the ML classifier associated with the document type to be the text-based ML classifier of the HDCS;
        when the image-similarity score is greater than the text-similarity score, determining the ML classifier associated with the document type to be the image-based ML classifier of the HDCS; and
        training the ML classifier associated with the document type with the training documents associated with the document type;
    classifying, via the determined first ML classifier, the document as being associated with a particular class of document of a plurality of classes of documents;
    classifying, via a second ML classifier associated with the class of document, the document as being associated with a particular subclass of a plurality of subclasses of the class of document; and
    communicating, by the HDCS and to a terminal, information that specifies the class and the subclass associated with the document.

2. The method according to claim 1, wherein classifying the document as being associated with the particular subclass of the plurality of subclasses of the class of document further comprises:
    selecting a subset of documents of the training documents associated with the document type that are associated with the particular class;
    determining a text-similarity score and an image-similarity score associated with the subset of documents, wherein the text-similarity score indicates a degree of textual relatedness between the subset of documents and the image-similarity score indicates a degree of graphical relatedness between the subset of documents;
    when the text-similarity score is greater than the image-similarity score, determining the second ML classifier associated with the class of document to be the text-based ML classifier of the HDCS;
    when the image-similarity score is greater than the text-similarity score, determining the second ML classifier associated with the class of document to be the image-based ML classifier of the HDCS; and
    training the second ML classifier with the subset of documents.

3. The method according to claim 1, wherein determining the text-similarity score associated with the training documents associated with the document type further comprises:
    defining a set of keywords associated with the document type; and
    determining, via a normalized similarity function, a distance between the set of keywords and words of the training documents.

4. The method according to claim 3, wherein the normalized similarity function corresponds to one of: a Euclidean distance function, and a cosine similarity function.

5. The method according to claim 1, wherein determining the image-similarity score associated with training documents associated with the document type further comprises:
    extracting, via a pre-trained model, features of each training document associated with the document type; and
    determining, via a normalized similarity function, a distance between features of each of the training documents associated with the document type.

6. The method according to claim 1, wherein the image-based ML classifier corresponds to a convolution classifier.

7. The method according to claim 1, wherein the text-based ML classifier corresponds to one of: a long-short-term (LSTM) classifier, a convolutional neural network (CNN), or a word embedder.

8. A system comprising:
    a memory that stores instruction code; and
    one or more processors in communication with the memory, wherein the instruction code is executable by the one or more processors to perform operations comprising:
    receiving a document that includes image data and textual data, wherein the document is associated with a document type;
    determining a first machine learning (ML) classifier implemented by the system associated with the document type, wherein the first ML classifier corresponds to one of an image-based ML classifier implemented by the system and a text-based ML classifier implemented by the system, and wherein determining the first ML classifier associated with the document type comprises;
        determining a text-similarity score and an image-similarity score associated with training documents associated with the document type, wherein the text-similarity score indicates a degree of textual relatedness between the training documents associated with the document type and the image-similarity score indicates a degree of graphical relatedness between the training documents associated with the documents type;

when the text-similarity score is greater than the image-similarity score, determining the ML classifier associated with the document type to be the text-based ML classifier of the system;

when the image-similarity score is greater than the text-similarity score, determining the ML classifier associated with the document type to be the image-based ML classifier implemented by the system, and training the ML classifier associated with the document type with the training documents associated with the document type;

classifying, via the determined first ML classifier, the document as being associated with a particular class of document of a plurality of classes of documents;

classifying, via a second ML classifier associated with the class of document, the document as being associated with a particular subclass of a plurality of subclasses of the class of document; and communicating, to a terminal, information that specifies the class and the subclass associated with the document.

9. The system according to claim 8, wherein classifying the document as being associated with the particular subclass of the plurality of subclasses of the class of document further comprises:

selecting a subset of documents of the training documents associated with the document type that are associated with the particular class;

determining a text-similarity score and an image-similarity score associated with the subset of documents, wherein the text-similarity score indicates a degree of textual relatedness between the subset of documents and the image-similarity score indicates a degree of graphical relatedness between the subset of documents;

when the text-similarity score is greater than the image-similarity score, determining the second ML classifier associated with the class of document to be the text-based ML classifier implemented by the system;

when the image-similarity score is greater than the text-similarity score, determining the second ML classifier associated with the class of document to be the image-based ML classifier implemented by the system; and training the second ML classifier with the subset of documents.

10. The system according to claim 8, wherein determining the text-similarity score associated with the training documents associated with the document type further comprises:

defining a set of keywords associated with the document type; and determining, via a normalized similarity function, a distance between the set of keywords and words of the training documents.

11. The system according to claim 10, wherein the normalized similarity function corresponds to one of: a Euclidean distance function, and a cosine similarity function.

12. The system according to claim 8, wherein determining the image-similarity score associated with training documents associated with the document type further comprises:

extracting, via a pre-trained model, features of each training document associated with the document type; and determining, via a normalized similarity function, a distance between features of each of the training documents associated with the document type.

13. The system according to claim 8, wherein the image-based ML classifier corresponds to a convolution classifier.

14. The system according to claim 8, wherein the text-based ML classifier corresponds to one of: a long-short-term (LSTM) classifier, a convolutional neural network (CNN), or a word embedder.

15. A non-transitory computer-readable medium having stored thereon instruction code, wherein the instruction code is executable by one or more processors for causing the one or more processors to perform operations comprising:

receiving a document that includes image data and textual data, wherein the document is associated with a document type;

determining a first machine learning (ML) classifier implemented by the instruction code associated with the document type, wherein the first ML classifier corresponds to one of an image-based ML classifier implemented by the instruction code and a text-based ML classifier implemented by the instruction code, and wherein determining the first ML classifier associated with the document type comprises:

determining a text-similarity score and an image-similarity score associated with training documents associated with the document type, wherein the text-similarity score indicates a degree of textual relatedness between the training documents associated with the document type and the image-similarity score indicates a degree of graphical relatedness between the training documents associated with the document type;

when the text-similarity score is greater than the image-similarity score, determining the ML classifier associated with the document type to be the text-based ML classifier implemented by the instruction code;

when the image-similarity score is greater than the text-similarity score, determining the ML classifier associated with the document type to be the image-based ML classifier implemented by the instruction code; and training the ML classifier associated with the document type with the training documents associated with the document type;

classifying, via the determined first ML classifier, the document as being associated with a particular class of document of a plurality of classes of documents;

classifying, via a second ML classifier associated with the class of document, the document as being associated with a particular subclass of a plurality of subclasses of the class of document; and communicating, to a terminal, information that specifies the class and the subclass associated with the document.

16. The non-transitory computer-readable medium according to claim 15, wherein classifying the document as being associated with the particular subclass of the plurality of subclasses of the class of document further comprises:

selecting a subset of documents of the training documents associated with the document type that are associated with the particular class;

determining a text-similarity score and an image-similarity score associated with the subset of documents, wherein the text-similarity score indicates a degree of textual relatedness between the subset of documents and the image-similarity score indicates a degree of graphical relatedness between the subset of documents;

when the text-similarity score is greater than the image-similarity score, determining the second ML classifier associated with the class of document to be the text-based ML classifier implemented by the instruction code;

when the image-similarity score is greater than the text-similarity score, determining the second ML classifier associated with the class of document to be the image-based ML classifier implemented by the instruction code; and training the second ML classifier with the subset of documents.

17. The non-transitory computer-readable medium according to claim 15, wherein determining the text-similarity score associated with the training documents associated with the document type further comprises:

defining a set of keywords associated with the document type; and determining via a normalized similarity function, a distance between the set of keywords and words of the training documents.

\* \* \* \* \*